Feb. 4, 1964  R. B. SCHMIDT  3,120,090
CONTOUR FOLLOWING CROP PICKUP ATTACHMENT FOR COMBINES
Filed Feb. 3, 1961  3 Sheets-Sheet 1

INVENTOR.
Rudolf B. Schmidt
BY
ATTORNEY.

Feb. 4, 1964 R. B. SCHMIDT 3,120,090
CONTOUR FOLLOWING CROP PICKUP ATTACHMENT FOR COMBINES
Filed Feb. 3, 1961 3 Sheets-Sheet 2
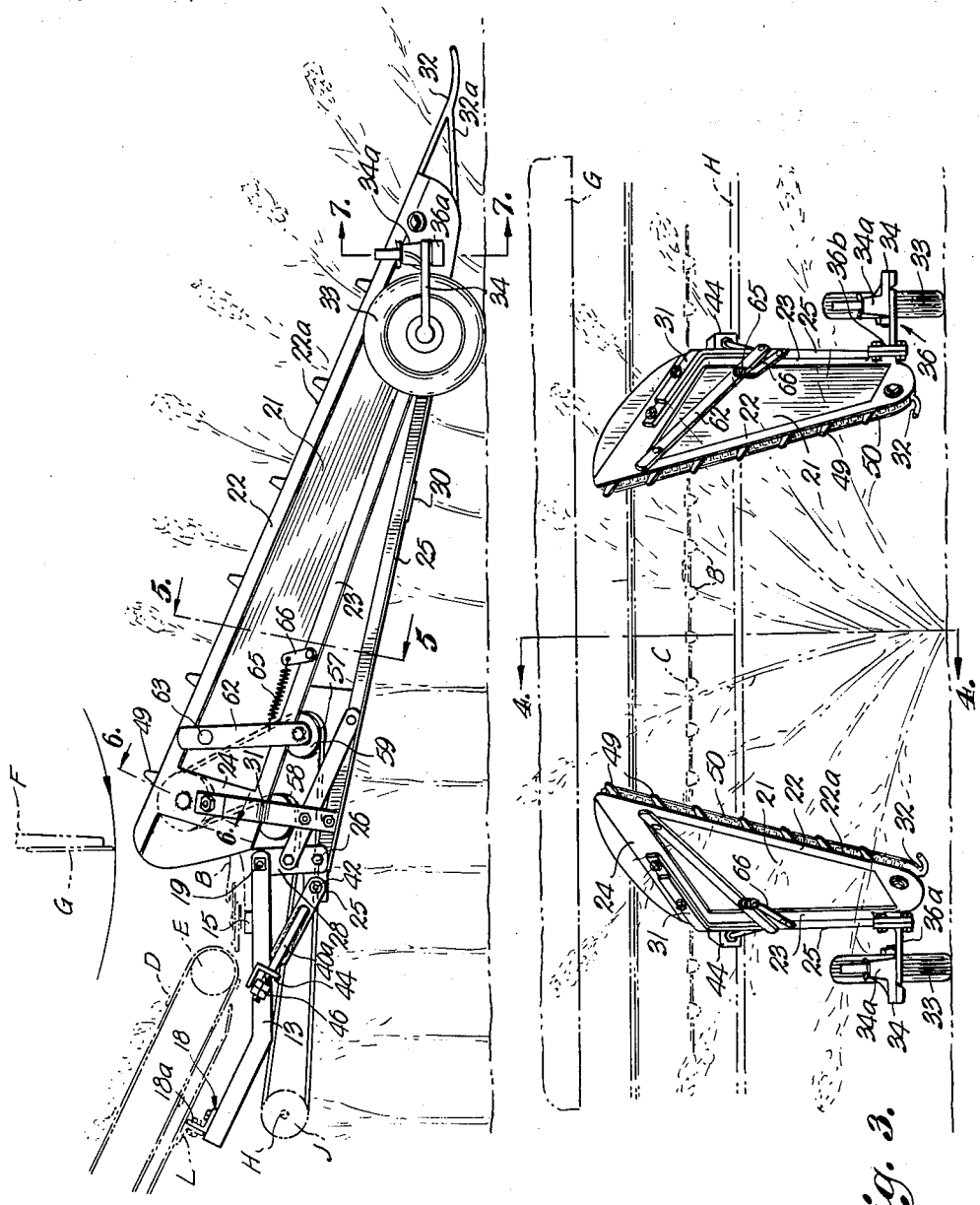
INVENTOR.
Rudolf B. Schmidt
BY Thos. E. Scofield
ATTORNEY.

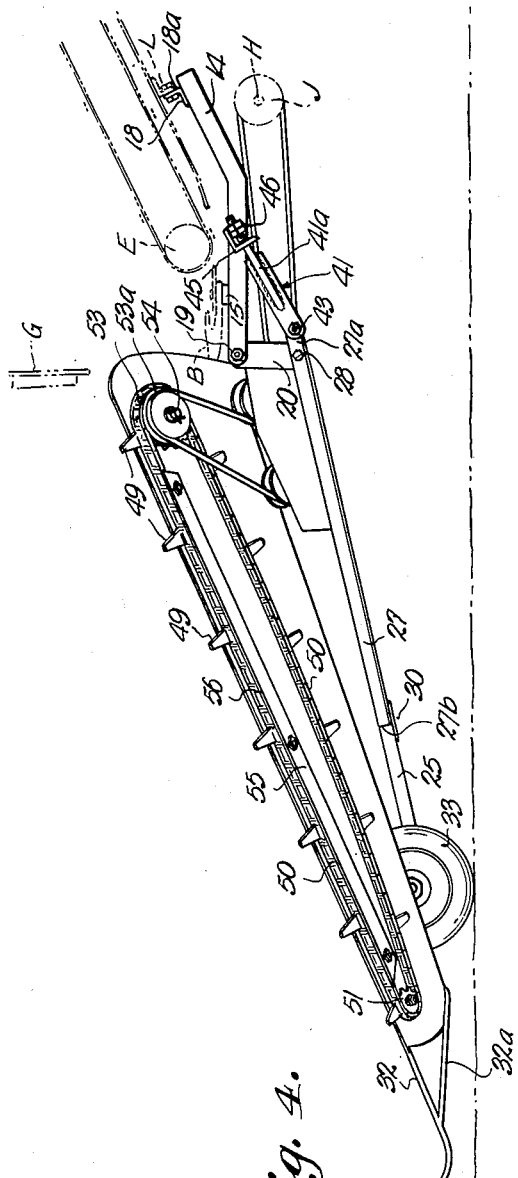
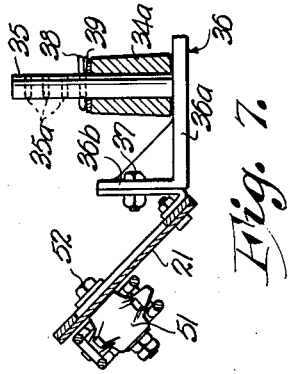
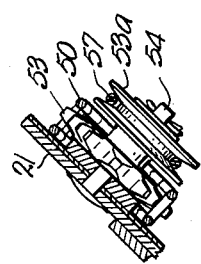
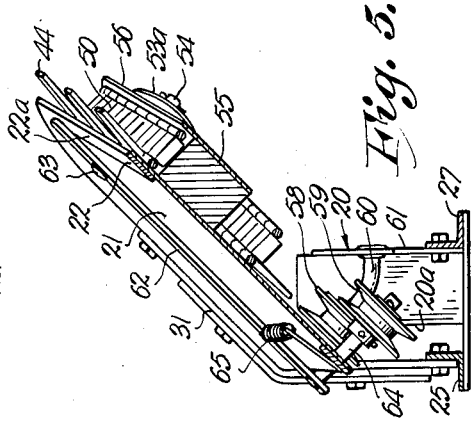
INVENTOR.
Rudolf B. Schmidt
BY
ATTORNEY.

United States Patent Office 3,120,090
Patented Feb. 4, 1964

3,120,090
CONTOUR FOLLOWING CROP PICKUP ATTACHMENT FOR COMBINES
Rudolf B. Schmidt, R.R. 1, Box 236, Walton, Kans.
Filed Feb. 3, 1961, Ser. No. 87,034
5 Claims. (Cl. 56—98)

This invention relates generally to crop harvesting apparatus and refers more particularly to an attachment for combines and the like which assists in the utilization of the combine for harvesting of row crops which have been downed or flattened by inclement weather and the like.

This application deals with an improvement over the disclosure of my co-pending application Serial No. 762,568, filed September 22, 1958, now Patent No. 2,970,420, issued February 7, 1961.

One of the principal objects of the present invention is to provide a row crop pickup attachment for combines having all of the advantages disclosed in the aforementioned application, as well as additional features which render it particularly useful in harvesting relatively tall crops, which are badly down and which are planted in relatively rough fields. In the present invention I have provided apparatus in which the pickup end of the attachment is so supported relative to the combine as to be able to continuously follow changing ground contours, thus maintaining the pickup end at a substantially constant spacing relative to the ground as the combine advances. Moreover, the spacing is maintained in such fashion that the pickup end is protected from digging into the ground and the resistance afforded by the pickup attachment to advancement of the combine through the field is held to a minimum.

Still another object of the invention is to provide a row crop pickup attachment of the character described in which the pickup attachment is so constructed as to make it possible to operate the cutter bar of the combine at substantial heights above the ground level while still preserving the contour following or floating action of the pickup attachment, thus permitting efficient harvesting of tall crops and the cutting of the heads from the stalks at points higher on the stalks than heretofore thought possible.

A further object of the invention is to provide a row crop pickup attachment of the character described in which the lead end of the pickup attachment is supported for free lateral movement from side to side as the combine advances and in response to sidewise shifts of the combine itself without digging into the ground or into furrows which may be present. The combined ability of the pickup attachment to rise and fall as the terrain changes and to move laterally with great freedom insures of smooth floating movement of the pickup attachment and of efficient pickup of the crops in conjunction with free and untrammeled operation of the combine.

A further object of the invention is to provide a row crop pickup attachment of the character described in which the connection with the combine is such that the attachment can be raised from contact with the ground during turns at the end of the field or in traveling from field to field by simply elevating the cutter bar of the combine and in which floating contact with the ground is reestablished by again simply lowering the cutter bar.

Still another object of the invention is to provide a row crop pickup attachment of the character described and including means for obtaining a positive and continuous drive to the stalk engaging teeth on the attachment as the pickup attachment rises and falls relative to the cutter bar during travel.

Other and further objects of the invention together with the features of novelty appurtenant thereto will appear in the course of the following description.

In the accompanying drawings which form a part of the specification and are to be read in conjunction therewith, and in which like reference numerals indicate like parts in the various views;

FIG. 2 is a side elevational view taken from the near side of FIG. 1;

FIG. 3 is a front view taken approximately at ground level and looking toward the approaching pickup attachments;

FIG. 4 is a view taken generally along the line 4—4 of FIG. 3 in the direction of the arrows;

FIG. 5 is an enlarged sectional view taken along line 5—5 of FIG. 2 in the direction of the arrows;

FIG. 6 is an enlarged fragmentary section taken along line 6—6 of FIG. 2 in the direction of the arrows; and FIG. 7 is an enlarged fragmentary section taken along the line 7—7 of FIG. 2 in the direction of the arrows.

Figure 1:
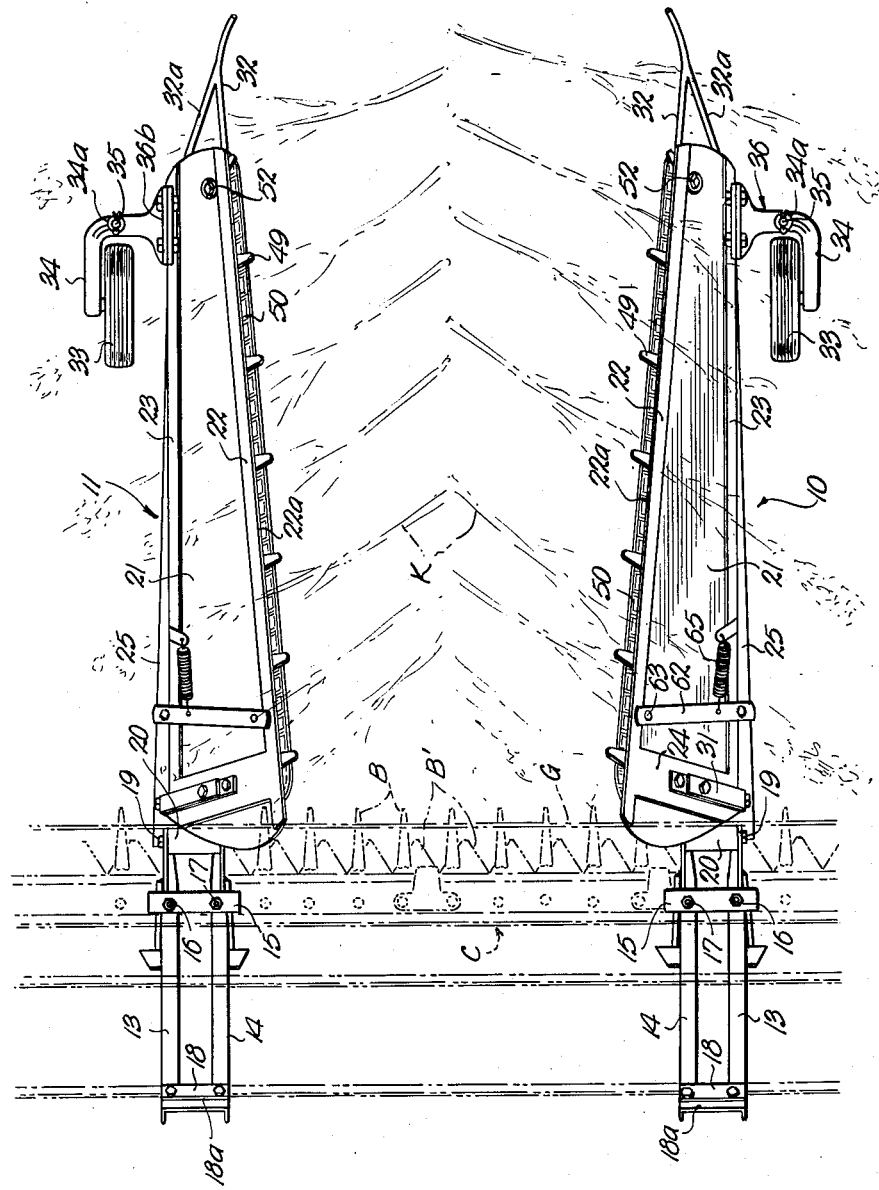
FIG. 1 is a top plan view showing in broken lines a fragmentary portion of the cutter bar of a conventional combine having mounted thereon a pair of pickup attachments embodying the invention, the pickup attachment being shown on opposite sides of a crop row.

Referring to the drawings, the conventional parts of a typical combine have been shown in FIGS. 1, 2, 3 and 4, these parts being shown in broken lines to aid in clarity of explanation and understanding. Such parts as shown comprise a portion of the cutter bar C having the blade guards B and generally triangular blades B'. Behind the cutter bar is located a conveyor D which travels over the lower roller E. A portion of the reel is shown at F, the reel including the relatively wide bat G which can best be seen in FIGS. 2, 3 and 4. The particular combine illustrated also has an auxiliary shaft H underlying the conveyor and on this shaft there is mounted a pair of sheaves J, only one of which is seen in FIGS. 2 and 4. On some combines such a shaft may have to be added. Shaft H is driven in conventional fashion from the power system for the combine. More will be said of its speed of rotation at a later point herein. The sheaves J are constructed for selective adjustment lengthwise of the shaft to bring them into general alignment with the pickup attachments later to be described.

For the purposes of illustrating the manner of operation of the invention, the combine and associated pickup attachments are shown in conjunction with a portion of a row of downed maize in which individual stalks have been identified by reference letter K. The downed stalks are shown as falling equally on opposite sides of the row.

The pickup attachments embodying the present invention are identified generally by reference numerals 10 and 11, the difference in reference numerals designating whether the units are "right-hand" or "left-hand." As will be observed from FIGS. 1 and 3, the attachments 10 and 11 may be disposed an opposite sides of the row. For the most part they extend forwardly of the cutter bar C of the combine. As will later be explained in more detail, they are adapted for connection with the combine through the medium of connecting means permitting up and down rocking movement of the pickup attachments relative to the cutter bar. So far as the construction of the individual pickup attachments is concerned, except for being mirror images of one another, they are substantially identical in construction and consequently the same reference numerals will be used to indicate like parts in the two attachments to simplify the understanding thereof.

The connecting means and support for each pickup attachment includes a bracket which underlies the cutter bar and apron of the combine, and is formed of two parallel angle members 13 and 14. These angle members are connected with one another immediately beneath the cutter bar by a crosspiece 15 which is perforated to receive therethrough bolts 16 and 17 which form a part of the combine structure and serve to hold the guards B in place on the cutter bar C. Another crosspiece 18 is provided at the rear of the bracket and this crosspiece is provided with a flange 18a which registers with and is secured to an angle member L running transversely of and forming a part of the illustrated combine structure. The angle member L runs across the combine parallel with roller E and the cutter bar C. In some cases, depending on the manufacturer, angle member L may have to be added on the bracket secured directly to the underside of the combine.

The forward portion or main body of the pickup attachment 10 or 11 on each side of the row is secured to its respective bracket by means of a pivot pin 19 which extends through suitable perforations in the angles 13 and 14, and rotatably supports a bearing and support member 20 forming a part of the main body of the attachment. It will be observed from FIGS. 2 and 4 that bearing member 20 ordinarily depends below the pivot pin 19, and preferably is of channel shaped cross section (FIG. 5). Rigidly secured to the bearing member 20 and extending forwardly thereof is the inclined plate member 21 which is reinforced along its upper and lower edges by the bar-like elements 22 and 23. The elements 22 and 23 form continuations of a reinforcing plate 24. The elements 22, 23 and 24 are secured to plate 21 by riveting, spot welding or other suitable means.

Disposed below the lower edge of plate 21 and diverging therefrom from front to rear is a bracing member 25 which, as in the bracket members 13 and 14, may be an angle section. The forward end is secured to the lower edge of the plate member, while the rearward end is attached to the lower end of the bearing member 20, as by bolt 26. A portion of the brace 25 extends rearwardly past the bearing member 20 to form an extension 25a.

A second brace member 27 (see FIG. 4) is disposed inside and substantially parallel with the outside brace member 25 and this runs rearwardly on the inside of bearing member 20 and is attached thereto by bolt 28. The inside brace does not extend the full length of the unit, but terminates at 27b (FIG. 4). The terminal end is firmly secured to the outside brace member 25. The securing means may be a bridging strap 30 underlying the respective brace members and welded thereto. As in the case of brace 25, brace 27 has a rearwardly extending portion 27a. The plate member 21 may further be supported from the outer brace 25 by the double strap 31.

Firmly attached to the forward end of the plate member 21, for example by welding, is a forward pickup end having the upper portion 32 and lower bracing portion 32a. It will be noted that the upper portion 31 forms a forward continuation of the upper edge 22a of the main body and that it terminates in a slightly upturned arc.

The forward end of the pickup attachment includes a ground engaging running wheel 33 which serves to support the pickup end slightly above ground level. The wheel is journaled by a suitable axle on the rearward end of a forwardly extending arm 34 having the forward head portion 34a centered with respect to and spaced forwardly of the wheel. The head 34a is provided with a vertical bearing aperture through which extends a pin 35. The lower end of pin 35 extends upwardly from a bracket 36 having the laterally projecting portion 36a and the mounting portion 36b. The latter is firmly attached to the side of plate member 21 as by bolts 37.

It will be noted that the vertical shaft or pin 35 is of sufficient length as to provide a portion extending well above the upper end of head 34a. This portion is provided with a plurality of vertically spaced apertures 35a (see FIG. 7) adapted to receive a cotter pin 38 or other retaining means. Obviously the position selected for the insertion of the pin will determine the spacing of the pickup end from the ground, and this spacing can be adjusted as desired. A washer 39 is interposed between the end of the head 34a and cotter pin to provide a suitable bearing surface.

The length of the projecting portion 36a of bracket 36 is such as to insure that the wheel arm 34 is capable of substantial pivotal movement on pin 35 so that the wheel is, in effect, castered relative to the forward end of the unit.

As has previously been noted, the main body of the pickup attachment is supported on the crosspin 19 for pivotal movement about the axis of the pin. It will be evident, therefore, that the wheel 33 will cause the main body to rise and fall in response to unevenness in the ground and to rock with respect to the cutter bar C. Thus, as the unit advances, the lead or pickup end will be maintained at a substantially uniform spacing with respect to the ground. While there may in some cases be a slight digging and because of the fact that the pickup end extends forwardly of the wheel, nevertheless, this is limited due to the close following of the wheel. The wheel itself in such instances absorbs the resistance caused by digging and prevents its transmittal to the rear connection.

Returning now to further description of the main body of the pickup attachment as represented generally by plate member 21, it will be observed that the upper edge 22a thereof lies in a plane which intersects the cutter bar along a line substantially normal thereto and which is inclined from the horizontal. While the angle of inclination of the plane containing the upper edge 22a and the angle of intersection with the cutter bar will both vary somewhat as the unit raises and falls and will depend to some extent on the elevation of the cutter bar above the ground, for best results care should be taken to so construct the unit that the angle of inclination approaches 45° and to confine the variation to a range of from 40° to 50°. The reasons for this are spelled out in detail in my earlier mentioned application, and consequently will not be repeated here.

In order to limit the range of downward swinging movement of the main body relative to the cutter bar, I have provided the links 40 and 41 which are pivotally pinned at one end by bolts 42 and 43, respectively, to the extensions 25a and 27a of the outer and inner brace elements 25 and 27. These links are spaced laterally from one another and are, in the illustrated embodiment, pieces of bar stock having secured thereto a rod portion 40a or 41a threaded at its free end. The rod portions extend loosely through apertured brackets 44 and 45, respectively, secured to the sides of the bracket members 13 and 14. The rod portions 40a and 41a are free to move longitudinally with respect to the brackets during normal operation. At the extreme outer end of each rod portion, nuts 46 may be threaded thereon to prevent disassociation of the rod from the brackets. However, the length of the rods must be such that nuts 46 will not engage the brackets during normal operation.

The shoulders formed by the end of the bar stock portion of each link should likewise be so spaced from the brackets 45 or 46 as to prevent interference therewith during the rocking movement of the main body to be expected in field operation. However, it will be evident that if the cutter bar of the combine is lifted sufficiently (means for accomplishing this are present on most combines) the shoulders will eventually be engaged by the brackets. From this point on further elevation of the cutter bar will also lift the entire pickup attachment and raise the wheel 33 from contact with the ground.

As in the unit disclosed in my aforementioned application, I have provided for stalk engaging fingers 49 which move rearwardly adjacent the upper edge of the pickup body. The fingers are secured to an endless chain 50 of the usual flexible link type. The chain is trained about a forward sprocket 51 mounted for rotation about a pin 52 secured to the plate member 21 and substantially normal thereto. Mounted in the same plane as the forward sprocket is the rearward sprocket 53 journaled for rotation about a stub axle 54 secured at its inner end to and extending from plate member 21 (see FIG. 6). Extending lengthwise between the sprockets and firmly secured to the plate member 21 is a support for the upper flight of the chain in the form of a bar 55 having its upper surface beneath the upper flight and provided with a lip 56 adapted to guide the chain and prevent it from sagging away toward the outside of the bar.

It will be noted that the teeth or fingers 49 are inclined substantially parallel with the plate member 21 and extend both above and inwardly of the upper edge 22a of the main body. The chain lies parallel with and adjacent the upper edge 22a throughout substantially its full length. The forward sprocket 51 should be located as far forward as possible and the rearward sprocket near the cutter bar C.

The rear sprocket 53 has integral therewith a sheave 53a. Sheave 53a has trained about it an endless belt 57 which is preferably of circular cross section. Belt 57 passes respectively around two idler pulleys 58 and 59 which are disposed below the rear sprocket 53 as best seen in FIGS. 2, 4 and 5. The respective flights of the belt are turned at an acute angle and extend rearwardly through an opening 20a in the bearing and mounting element 20 (FIG. 5). The belt leads to the sheave J on shaft H, these parts having been earlier described. It will thus be seen that rotation of shaft H will cause rotation of sheave 53a and thus sprocket 53, and drive the chain 50 to move the teeth 49 upwardly parallel to the crop lifting and guide surface 22a.

The idler pulley 58 is mounted on a fixed pin 60 which is secured to and extends from a plate 61 affixed along its lower edge to the inside brace member 27 and at the rear to the member 20. The other idler pulley 59 is carried at the lower end of a lever arm 62 pivoted to the plate 21 as at 63. The pulley shaft 64 extends inwardly from the free end of the arm beneath the lower edge of plate member 21, and is spaced sufficiently below the edge to permit of limited pivotal movement of the arm. A tension spring 65 is connected at one end with the arm and at the other with an anchor clip 66 and serves to yieldably bias the arm in a direction to maintain the belt taut. Obviously spring 65 will cause pivoting of the arm to take up slack when the main body swings clockwise as viewed in FIG. 2, and will give when movement is counterclockwise.

In use the attachments are secured to the combine in the manner described. For crop pickup under the conditions illustrated, that is, to pick up downed plants on either side of a single row a pair of right-hand and left-hand attachments are mounted as shown in FIGS. 1, 3 and 4. The lateral spacing of the units of a pair is such that the pickup ends are spaced apart approximately the average height of the plant which is being harvested.

To harvest the crop the combine is advanced through the field in the direction of the crop row with the attachments on opposite sides of and equidistant from the row center. The ground engaging wheel 33 of each attachment supports the pickup end adjacent the ground so that it is in position to slip beneath the downed stalks. The pickup end will, of course, rise and fall according to changing ground contours and thus, as noted earlier, the pickup end is maintained at a substantially uniform spacing with respect to the ground. As the combine advances the stalks K ride up the crop engaging and lifting surface 22a and since the engagement with the stalk is approximately at the midpoint thereof, the lifting force is gentle.

Lifting takes place rather slowly as compared with other units with which I have knowledge, and consequently there is little or no whipping action tending to impose undue and severe stresses on the stalks. As the combine continues to advance, the stalks are raised sufficiently that their heads are engaged by the bat G of the combine wheel, thus throwing the stalk into the cutter bar and causing severing off the head. The rear terminus of the crop engaging surface 22a should be close enough to the cutter bar as to insure that the stalk will be maintained in position to be cut as it is engaged by the blades.

The riding up of the stalks on the guide surface 22a is assisted materially by the moving teeth 49. The sheave 53a and the sheave J on power shaft H are dimensioned in such fashion as to cause the teeth to move rearwardly at approximately the same speed the combine is moving forwardly whereby the stalks are held stationary relative the advance of the combine. In other words, lifting into cutting position is accomplished with a minimum of pushing or pulling of the stalks from their original position.

When the combine reaches the end of a row or if for any other reason it is found desirable to lift the pickup attachments from ground engaging contact, this can be accomplished by simply causing the header portion of the combine, which includes the cutter bar, to be raised sufficiently to bring the shoulders of the link rods 40 and 41 into engagement with the brackets 45 and 46. As raising continues, the pickup attachments will be lifted with the cutter bar and the wheels 33 freed from contact with the ground.

It will be understood that more than one pair of lift and guide elements 10 and 11 can be mounted on any one combine. I have shown one pair only merely to simplify the explanation and conserve space on the drawings.

Of course, it is evident that the spacing of the devices 10 and 11 from one another and the relative positions along the cutter bar can be changed by disconnecting the units and reconnecting them in the desired positions. The sheaves J can be moved lengthwise of shaft H to align them with the repositioned devices and again locked to the shaft. Thus, the invention is readily adaptable to the handling of crops of various heights and types with a minimum of difficulty.

In this connection I have found that the attachments are also quite useful in picking up matted and entangled stalks which have fallen from two adjacent rows into the space between the rows and across each other. Under these circumstances the right and left-hand attachments are reversed on the combine so that the plate members 21 diverge upwardly rather than converge. The attachments are spaced more closely together in this case so that they will both travel in the space between the rows. The entangled stalks are lifted much like a mat, that is, as a body, and cutting is accomplished without the shredding and breakage which would ordinarily occur if it should be attempted to separate the stalks from one another. This feature of the invention is particularly useful in tall hybrid maize having a height of four feet to five feet.

From the foregoing it will be seen that this invention is one well adapted to attain all of the ends and objects herein above set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A pickup attachment adapted to be mounted ahead of the cutter bar of a harvesting machine comprising a plant lifting and guide element having a forward pickup end adapted to be disposed ahead of and below the level of the cutter bar and an upwardly inclined lifting and engaging surface extending from the pickup end to a point above the cutter bar, said lifting and engaging surface lying in a plane inclined from the horizontal and intersecting the cutter bar along a line transverse to the cutter bar, connecting means adapted for connection with the harvesting machine and to support the rearward portion of said element for swinging movement of the element about an axis substantially parallel with said cutter bar, a ground engaging element support wheel spaced laterally to one side of said pickup end, and wheel mounting means connecting said wheel with said element and operable to support the forward end of said element from said wheel and to cause said element to rise and fall as said wheel follows the ground contours, the wheel being connected with said element for swinging movement relative to said element about an upright axis and spaced laterally from the pickup element sufficiently to permit substantial swinging of the wheel relative to said element about said upright axis.

2. A pickup attachment as in claim 1 wherein said connecting means includes stop means operable to limit the downward swinging movement of said element to a preselected value.

3. A pickup attachment to be mounted ahead of the cutter bar of a harvesting machine comprising a plant lifting and guide element having a forward pickup end adapted to be disposed ahead of and below the level of the cutter bar and an upwardly inclined lifting and engaging surface extending from the pickup end to a point above the cutter bar, said lifting and engaging surface lying in a plane inclined from the horizontal and intersecting the cutter bar along a line transverse to the cutter bar, an endless flexible carrier having a portion parallel with said lifting and engaging surface and adjacent thereto, means on said element including a pair of sprockets supporting said curve for movement relative thereto, conveying teeth mounted on and spaced along said carrier, said teeth so formed and oriented that when moving adjacent and parallel to said surface, they project above said surface whereby to engage a plant lying across said surface, connecting means adapted for connection with the harvesting machine and to support the rearward portion of said element for swinging movement of the element about an axis substantially parallel with said cutter bar, a ground engaging element support wheel spaced laterally of said pickup end, wheel mounting means connecting said wheel with said element and operable to support the forward end of said element from said wheel and to cause said element to rise and fall as said wheel follows the ground contours, and power transmission means including a belt having driving connection with one of said sprockets and yieldable belt tightening means engaging said belt and operable to maintain said belt taut during said swinging movement of said element, said belt tightening means including an idler pulley connected with said element for movement of its axis relative thereto, and resilient means biasing said pulley toward said belt.

4. A pickup attachment adapted to be mounted ahead of the cutter bar of a harvesting machine comprising a plant lifting and guide element having a forward pickup end adapted to be disposed ahead of and below the level of the cutter bar and an upwardly inclined lifting and engaging surface extending from the pickup end to a point above the cutter bar, said lifting and engaging surface lying in a plane inclined from the horizontal and intersecting the cutter bar along a line transverse to the cutter bar, a ground engaging element support wheel spaced laterally to one side of said pickup end, wheel mounting means connecting said wheel with said element and operable to support the forward end of said element from said wheel and to cause said element to rise and fall as said wheel follows the ground contours, the wheel being connected with said element for swinging movement relative to said element about an upright axis and spaced laterally from the pickup element sufficiently to permit substantial swinging of the wheel relative to said element about said upright axis, and means for connecting the rearward portion of said element to said harvesting machine for rocking movement about an axis substantially parallel with the cutter bar in response to the following of ground contours by said ground engaging wheel, said last named means including stop means operable to limit the downward swinging movement to a preselected value.

5. A pickup attachment adapted to be mounted ahead of the cutter bar of a harvesting machine comprising a plant lifting and guide element having a forward pickup end adapted to be disposed ahead of and below the level of the cutter bar and an upwardly inclined lifting and engaging surface extending from the pickup end to a point above the cutter bar, said lifting and engaging surface lying in a plane intersecting the cutter bar along a line transverse to the cutter bar, an endless flexible carrier having a portion parallel with said lifting and engaging surface and adjacent thereto, means on said element including a pair of sprockets supporting said carrier for movement relative thereto, conveying teeth mounted on and spaced along said carrier, said teeth so formed and oriented that when moving adjacent and parallel to said surface, they project above said surface whereby to engage a plant lying across said surface, connecting means adapted for connection with the harvesting machine and to support the rearward portion of said element for swinging movement of the element about an axis substantially parallel with said cutter bar, a ground engaging element support wheel spaced laterally of said pickup end, wheel mounting means connecting said wheel with said element and operable to support the forward end of said element from said wheel and to cause said element to rise and fall as said wheel follows the ground contours, and power transmission means including a belt having a driving connection with one of said sprockets.

References Cited in the file of this patent
UNITED STATES PATENTS

| | | |
|---|---|---|
| 582,654 | Lindsey | May 18, 1897 |
| 2,261,282 | Pond | Nov. 4, 1941 |
| 2,970,420 | Schmidt | Feb. 7, 1961 |